Feb. 8, 1944.    M. H. HANSEN    2,340,958
SPRING SCALE
Filed March 1, 1941
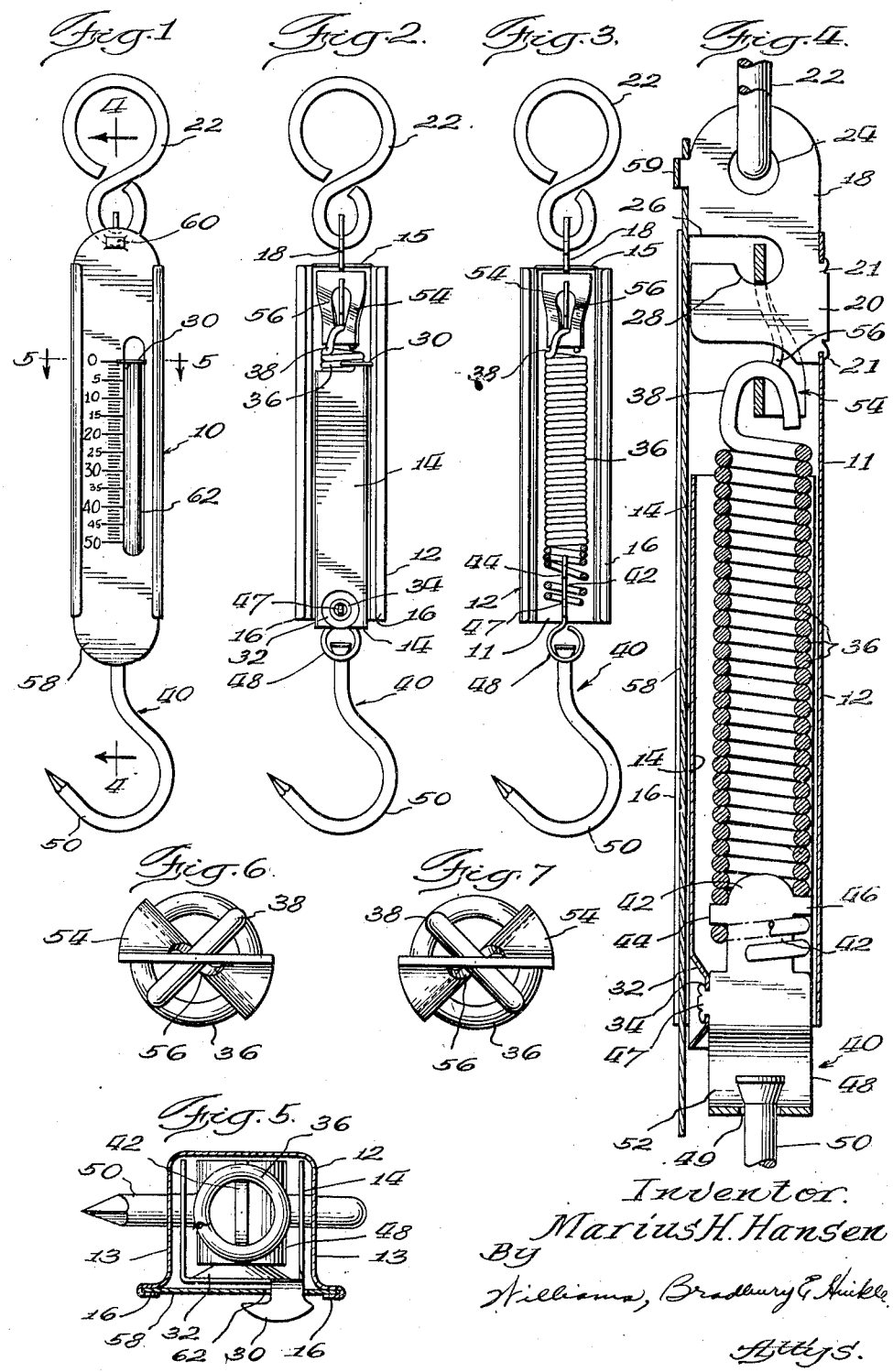
Inventor.
Marius H. Hansen
By Williams, Bradbury & Hinkle
Attys.

Patented Feb. 8, 1944

2,340,958

UNITED STATES PATENT OFFICE 2,340,958

SPRING SCALE

Marius H. Hansen, Chicago, Ill., assignor to Hanson Scale Company, Chicago, Ill., a corporation of Illinois Application March 1, 1941, Serial No. 381,246

11 Claims. (Cl. 265—63)

The present invention relates to scales, and more particularly to a scale of the spring type in which the weight is indicated upon a linear dial.

An object of the invention is the provision of a new and improved scale particularly adapted for domestic use.

Another object is to provide a scale which is simple and inexpensive to manufacture yet durable in construction and accurate in use.

A further object of the invention is the provision of a new and improved link for suspending a spring in a scale housing in freely sliding relation therewith.

A further object of the invention is the provision of a new and improved spring scale in which final adjustment of the spring to provide the proper resistance may be made prior to the final assembly of the scale.

A further object of the invention is the provision of a method for the quantity manufacture of scales from prefabricated interchangeably usable parts.

A further object of the invention is the provision of a method for the quantity manufacture of scales by finally adjusting a spring to an effective length necessary to provide the proper resistance prior to the assembly of the scale, and suspending the spring in a housing by means of one of a pair of oppositely formed links which compensate for angular displacement between the spring hook and suspending means in the housing resulting from the adjustment of the spring.

A further object of the invention is the provision of a spring scale having a new and improved link for suspending a spring and a guide member for the spring in the housing of the scale in freely sliding relation therewith.

Other objects and advantages of my invention will become apparent from the ensuing description of an embodiment thereof, in the course of which reference is had to the accompanying drawing, in which:

Fig. 1 is a front elevational view of the scale of the present invention;

Fig. 2 is a front elevational view of the scale with the dial removed;

Fig. 3 is a front elevational view partly in section showing a scale with the dial and guide member removed;

Fig. 4 is an enlarged sectional view on a vertical plane passing thorugh the front and back of the scale;

Fig. 5 is a sectional view taken on the line 5—5 of Fig. 1:

Fig. 6 is a top plan view of a suspending link and spring, showing the angular twist in one form of the link;

Fig. 7 is a top plan view of a form of suspending link and spring angularly twisted in a direction opposite to that of the link shown in Fig. 6.

Referring now to the drawing, and more particularly to Figs. 1, 2, and 3, the scale which is indicated generally by the reference character 10 is provided with an elongated housing 12 of polygonal cross-section and an elongated guide member 14 telescopically received in the housing. The housing 12 comprises a single piece of sheet metal bent to form an elongated trough, preferably of square cross-section, with a back 11, parallel side walls 13, and a closed upper end 15 which has a centrally located transverse slot therein. The sides are crimped to form opposed channels 16 along the longitudinal edges of the housing as best shown in Fig. 5.

A load head 18 of sheet metal is positioned in the slot in the upper end of the housing and has an extension 20 along its back edge which projects through a slot in the back of the housing and is peened against the back of the housing, as indicated at 21 in Fig. 4, to hold the latter in position on the load head. The load head 18 is also provided with a slot 26 in its lower end, which terminates in a downward extension 28 from which the upper end of the spring is supported.

Suitable means are provided for suspending the scale from a fixed support, for example, a heavy wire 22 bent into the form of an inverted figure 8, one loop of which is engaged in an aperture 24 in the upper end of the load head 18. The particular arrangement of parts above described re- results in a sturdy and durable scale, since the entire weight of the scale and the object being weighed is borne by the load head and not by any part of the housing, which, being of relatively light sheet metal, would tend to become deformed if subjected to the strain of the weight of objects placed on the scale for weighing.

The guide member 14 comprises a single sheet of metal bent to form an elongated guide of cross-section similar to that of the housing and having three surfaces forming a front and parallel sides. The guide member is of such size that it slides freely in the housing and has an integral pointer 30 for registering on the dial of the scale. The pointer is formed by bending outwardly into a plane normal to the plane of the front of the guide member, an integral hook-like part extending from the upper edge of the guide member, as shown in Fig. 5. The guide member also has a circular recessed portion 32 in the front thereof and a centrally located aperture 34 in the recessed portion 32.

The spring 36 with which the scale is provided is of the helical tension type and terminates at one end in a hook 38 by which the spring is suspended in the housing.

To the other end of the spring is secured a draw bar 40, best shown in Figs. 3 and 4. The draw bar is of metal plate and has an upwardly extending part 42 of width slightly less than the internal diameter of the spring. Oppositely disposed lugs 44 and 46 on the edges of the upwardly extending part of the draw bar are vertically spaced a distance equal to the pitch of the spring so that the draw bar may be secured to the lower end of the spring by screwing the lugs along the convolutions of the spring. By turning the draw bar various distances along the spring, its operative length may be adjusted so that the spring has a predetermined resistance. In this manner it is possible to compensate for the differences in elastic tension of different springs and adjust the resistance thereof before the scales are assembled so that the pointer will accurately register between the minimum and maximum amounts indicated on the dial without further separate adjustment of each individual scale after it is assembled.

A centrally located lug 47 on the edge of the draw bar 40 is received in the aperture 34 in the recessed portion 32 of guide member 14 and is peened over to hold the draw bar and guide member in fixed relation so that the guide member and pointer 30 on the upper end thereof move with the lower end of the spring. Suspending means for a load hook 50 are formed integral with the draw bar by bending its lower end into an open cylinder 48. The hook 50 is received in a centrally located aperture 49 in the lower wall of the cylinder.

Hook 50 is formed from an unfinished nail and has its head loosely enclosed in the walls of the cylinder 48. The cylinder is of a diameter which prevents the hook from accidentally slipping out of the aperture 49 yet does not impede rotation of the hook about a vertical axis and permits sidewise movement of the hook in all directions to a limited extent. This arrangement of parts permits a load to swing freely from the scale and greatly lessens the possibility of damage to the scale if, in placing a load thereon, it is hung in an off-center position on the hook and is suddenly released so that it swings from the scale.

When the parts of the scale of the present invention are in assembled relation, the draw bar 40 and the sides of the guide member 14 must lie in planes parallel with the sides of the housing 12 in order that the guide member may slide freely in the housing without binding. The load head 18 is also parallel with the sides of the housing and is fixedly secured in that position, but the hook 38 on the spring may be angularly displaced from these planes in either direction up to 180° as a result of the differences in adjustment of the draw bar on different springs.

If the scale is to operate properly the spring must normally assume a position in which the draw bar and the sides of the guide member will be maintained parallel with the sides of the housing. In the normal position of a spring of this type the suspending hook is at right angles to the edge upon which it is suspended when the spring hangs freely and any displacement from this position will set up a torque between the hook and suspending edge tending to restore the spring to its normal position. If the edge is fixed the spring will tend to twist. To prevent this action of the spring in the scale, means must be provided between the fixed load head 18 and the suspending hook 38 of the spring which will present a suspending edge at right angles to the hook 38 irrespective of the plane in which the hook may lie.

In the scale of the present invention I have provided a novel link 54 for suspending the spring from the load head. The link 54 is made in two forms to compensate for angular displacement in any direction and in any degree between the spring hook 38 and load head 18. Link 54 is formed from a rectangular sheet metal plate having an elongated slot 56 therein, and is suspended from the opening 28 in the load head with the spring hook 38 received in the slot 56. In forming the link, the ends thereof are twisted in opposite directions so that the upper and lower bearing surfaces of the slot 56 lie in planes which are angularly displaced approximately 45 degrees from each other. There is some play, in either angular direction, between the link 54 and the load head 18 and between the link 54 and the spring hook 38. I have found that when the spring is in place it may be moved through a total angular displacement of 90 degrees without causing appreciable angular distortion of the spring 36.

In Figs. 6 and 7 are shown two forms of the link 54, and either form may be used in assembling the scale. These two forms of the link 54 are identical, with the exception that the lower end of the link shown in Fig. 6 is twisted in a clockwise direction, while the lower end of the link shown in Fig. 7 is twisted in a counterclockwise direction. Thus, by the choice of either of these two links, one has the choice between two normal positions 90° apart, of the lower bearing surface of the link 54. Inasmuch as the spring hook 38 may be inserted from either side of the link 54 and can rotate through 90° without causing angular distortion of the spring 36, it is seen that the draw bar 42 may be given any angular relation to the spring 36 and, by the choice of the proper link, the scale may be assembled so that there will be no binding between the guide member 14 and the shell 12. It is apparent the same result may be obtained through the choice of any two links having a difference of 90° between their respective angular distortions. However, by twisting each link 45°, this result is secured with the smallest maximum distortion of one of the links. The choice of link to be used in assembling any particular scale will depend on the direction of angular displacement of the hook 38 when the spring and draw bar have been adjusted, and this choice is easily made because there are only two forms of links which are used.

A metal dial 58 which may be calibrated in pounds or in any other units is slidably received in the channels 16 of the housing. This dial is permanently secured in position by pressing the upper end over the projection 59 on the upper edge of the load head 18, as shown at 60. The dial 58 has an elongated slot 62 in which the pointer slides between the minimum and maximum positions. The slot 62 extends a short distance below the last marking on the dial and serves as a stop to prevent over extension of the spring. If a weight greater than the capacity of the scale is placed thereon the pointer 30 strikes the lower end of the slot 62 and prevents extension of the spring beyond its elastic limit.

In assembling the scale, the draw bar 40 is first adjusted on the spring so that the spring will have the proper resistance, and the spring is then placed in position in the housing 12, using a link 54 which will permit suspension of the spring with the draw bar in a plane parallel with the sides of the housing. A guide member 14 and dial 58 are slid into preliminary position with the pointer 30 hooked through the slot 62 in the dial, and the spring is then extended until the lug 47 on the draw bar passes beyond the lower edge of the dial and is exposed, whereupon the guide member is retracted from its preliminary position to a position in which the lug 47 engages in the aperture 34 in the recessed portion 32 of the guide member. The parts are permanently secured together by peening over the lug 47.

After the spring has been released, the dial is moved to its permanent position in which the zero line is directly beneath the pointer 30 and it is secured in this position by pressing the upper end thereof over the projection 59 on the load head.

It has been found that the elastic tension of springs of the type used in suspension scales varies somewhat between springs of the same size. The operative length of each spring must be separately adjusted to provide the proper resistance. With the draw bar of this invention the adjustment can be accurately made prior to the time at which the scale is finally assembled, and by use of a link 54 the separately adjusted springs and separately fabricated parts may be used interchangeably in assembling the scale without the necessity of adjustment after the scale has been assembled.

The links 54 by which the spring is suspended in the housing are of simple and inexpensive construction yet effectively maintain the spring 36 and guide member 14 in freely sliding relation with the housing 12. Since one or the other form of link will compensate for any angular position in which the hook 38 on the spring may lie, it is not necessary to provide a large number of different forms of links. It is apparent that this reduces the cost of the links and simplifies the selection of the proper one by the person who is assembling the scale. The links also have the advantage that by the use thereof a method of fabricating and assembling may be followed which greatly reduces the cost of the scales.

The durability and sturdiness of the scale is increased by the particular arrangement of parts herein disclosed. No part of the weight of the scale or object being weighed is borne by the housing of the scale. All weight is borne directly by the load head 18 which may be constructed of sufficiently heavy metal plate to withstand the strain upon it without increasing the cost of the scale.

From the foregoing description it should be apparent that the parts are so designed that a method of assembling may be followed which requires a minimum of time and no skilled labor. This, and the fact that the parts are inexpensive to construct, and as in the case of the draw bar 40, are designed to serve several purposes, greatly reduces the cost of manufacturing the scale without impairing its accuracy or durability.

It is to be understood that the preferred embodiment of my invention described in detail herein is merely illustrative and should not be construed to limit the invention in any way.

I claim:

1. In a scale of the class described having a spring with a guide member secured at the free end of the spring permitting longitudinal movement of said end and preventing rotation thereof and an integral suspending hook at the opposite end, a spring suspension load head secured in said scale, means for adjusting the effective length of said spring prior to assembly of the scale to provide a predetermined resistance, said adjustment causing said hook to lie in a plane angularly disposed with respect to the plane of said load head in amounts varying with the adjustment of said spring when said spring and guide member are in assembled relation in said scale, and a link for suspending said spring from said load head, said link having an angular curvature in a longitudinal direction offsetting the angular displacement of said suspension hook from the plane of said load head.

2. In a scale of the class described, in combination a housing and a guide member longitudinally movable with respect to each other, spring suspension means secured to said housing, a spring having its free end secured to said guide member by means adjustable on said spring to vary the resistance thereof, a hook on the opposite end of said spring disposed in a plane which may be angularly displaced from the plane of the suspension means, in any direction or degree after the adjustment of the means, and a link for suspending said spring from said suspension means, said link having an angular displacement in a longitudinal direction which compensates for the displacement between said hook and suspension means thereby preventing binding between said housing and guide member due to the displacement between said hook and suspension means whereby said spring and guide members are maintained in freely sliding relation with said housing.

3. In a scale of the class described wherein a spring is suspended in a housing from a load head and has a free end and an integral suspension hook on the opposite end, the combination comprising a spring suspension link curved to compensate for angular displacement between said load head and suspension hook, a draw bar and load hook suspension secured on the free end of the spring, said draw bar being adjustable to provide an effective length of spring which will have a predetermined resistance, a slotted dial secured in said housing, a guide member secured on said draw bar and movable therewith, said guide member having an integral indicator which moves in the slot of said dial and cooperates with the lower end thereof to prevent overextension of said spring.

4. In a scale of the class described having a housing and a spring in said housing having an integral hook on one end and a guide member on the free end permitting telescopic movement of the free end in said housing but preventing rotation thereof, the combination comprising a non-adjustable link for suspending said spring in said housing, said link being twisted to compensate for angular displacement between said housing and said spring whereby binding between the guide member and the housing is eliminated, a draw bar having means on one end for threading along the convolutions of the free end of said spring for varying the effective length thereof to provide a length of predetermined resistance, and having load hook suspension means formed in its opposite end, said means permitting rotation of the hook about a vertical axis and limited sidewise movement in every direction.

5. The method of manufacturing spring scales which comprises prefabricating the interchangeably usable parts hereinafter referred to and assembling such parts, the assembly operation including adjusting the effective length of the spring to a length having a predetermined resistance by the use of a draw bar having a part threadable along the convolutions of the spring, said adjustment causing said draw bar and a suspension hook on said spring to lie in planes angularly displaced with respect to each other in any degree, suspending the spring on a load head in a housing with one of a pair of oppositely twisted links the selective use of which provides angular displacement between the hook on the spring and the load head sufficient to permit said draw bar to lie in a plane parallel with the sides of the housing, positioning a dial and guide member having an integral indicator in a preliminary position, securing said guide member to said draw bar with the spring extended beyond the end of said dial, moving said dial to its final position and permanently securing said dial in the latter position by pressing a part thereof over a lug on the load head of said scale.

6. A combination draw bar and load hook suspension means for a spring scale comprising an elongated plate having an apertured end, and having oppositely disposed lugs longitudinally spaced a distance equal to the pitch of the spring on the other end, said lugs being threadable along the convolutions of the spring to secure the draw bar thereon and to vary the operative length of the spring to provide a predetermined resistance, and a load hook received in said aperture, said load hook having a head enclosed in a cylinder formed by bending the apertured end of the draw bar about the head, said cylinder permitting rotation of said hook about a vertical axis and limited sidewise movement in all directions but preventing withdrawal thereof.

7. In a scale having a guide member secured on a spring and longitudinally but non-rotative movable in a housing, and having fixed suspension means on the spring and in the housing, a link for suspending the spring and guide member on the suspension means in said housing, said link comprising a slotted plate having its ends angularly displaced to compensate for an angular displacement of at least 45° between the fixed suspension means on the spring and in the housing, whereby angular displacement therebetween is offset when the parts are in assembled relation and the guide member and spring are maintained in freely sliding relation with the housing.

8. In a spring scale wherein a spring is suspended from an integral hook which may lie in any plane when the parts of the scale are in assembled relation, a link for suspending the spring in the scale, comprising a slotted plate having an angular curvature in a longitudinal direction, said link being adapted to provide an edge for the suspension of the hook on said spring which will be in a plane at approximately right angles to the plane of the hook, whatever the plane of the latter may be, and fixed load carrying means having a part extending into the slot in said plate to support said plate and spring.

9. In a spring scale, the combination of a spring suspension member, a housing affixed to said spring suspension member, a calibrated load carrying spring enclosed by said housing, the movable end of said spring being prevented from rotating with respect to said housing, a hook affixed to the stationary end of said spring and adapted to be displaced relative to said suspension member, and a link connecting said hook and said spring suspension member and having an upper and a lower bearing surface, said bearing surfaces being angularly displaced from each other approximately 45° in a direction corresponding to the direction of angular displacement of the hook and spring suspension member.

10. In a spring scale, the combination of a helical spring, a spring suspension member having a bearing surface for suspending said spring, a housing affixed to said suspension member and enclosing said spring, a guide member carried by the movable end of said spring to prevent said movable end from rotating with respect to said housing, a hook affixed to the stationary end of said spring for suspending it and adapted to be displaced relative to said suspension member, a link having two bearing surfaces, one engaging said hook and the other engaging said spring suspension member to retain said spring to said suspension member, said link being chosen from a pair of links, the angular displacement between the axes of the two bearing surfaces of one of the links differing by 90° from the angular displacement between the axes of the two bearing surfaces of the other said links, the chosen link having its bearing surfaces displaced in a direction corresponding to the direction of angular displacement of the hook and spring suspension member.

11. In a spring scale, the combination of a spring suspension member, a shell affixed to said member, open on one side, and having two oppositely disposed substantially parallel channels, one on each side of said open side, to receive an indicator dial, a helical spring within said shell, a load carrying member affixed to the other end of said spring, guiding means for preventing said load carrying member from rotating in relation to said shell, means for affixing the stationary end of said spring to said suspension member without inducing angular distortion in said spring when it is operating in its normal angular position, a calibrated indicating dial of sheet metal inserted into and engaging said channels and having a slot therein adjacent the calibrations thereon, a pointer carried by said load carrying member and passing through said slot, said pointer being positioned to be opposite the upper end of said spring when no load is impressed upon said scale and to engage the lower end of said slot when an overload is placed on said spring, and a projection affixed to said suspension member and engaging a deformation in said dial to prevent said dial from sliding in said channel after it has been placed in its proper position.

MARIUS H. HANSEN.